United States Patent
Yi et al.

(10) Patent No.: US 7,295,573 B2
(45) Date of Patent: Nov. 13, 2007

(54) METHOD FOR INSERTING LENGTH INDICATOR IN PROTOCOL DATA UNIT OF RADIO LINK CONTROL

(75) Inventors: Seung June Yi, Seoul (KR); Jin Young Park, Kunpo (KR)

(73) Assignee: LG Electronics Inc., Seoul (KR)

( * ) Notice: Subject to any disclaimer, the term of this patent is extended or adjusted under 35 U.S.C. 154(b) by 731 days.

(21) Appl. No.: 09/932,459

(22) Filed: Aug. 20, 2001

(65) Prior Publication Data

US 2002/0048281 A1  Apr. 25, 2002

Related U.S. Application Data

(63) Continuation-in-part of application No. 09/863,400, filed on May 24, 2001, now abandoned.

(30) Foreign Application Priority Data

Aug. 19, 2000 (KR) ................................ 2000-48144

(51) Int. Cl.
   *H04J 3/22* (2006.01)
   *H04J 3/00* (2006.01)
(52) U.S. Cl. ........................ 370/469; 370/470; 370/476
(58) Field of Classification Search ........ 370/464–476, 370/349
   See application file for complete search history.

(56) References Cited

U.S. PATENT DOCUMENTS

| 6,507,582 B1 * | 1/2003 | Abrol ........................... 370/394 |
| 6,542,490 B1 * | 4/2003 | Ahmadvand et al. ....... 370/338 |
| 6,665,313 B1 * | 12/2003 | Chang et al. ............... 370/469 |
| 2004/0114565 A1 * | 6/2004 | Sipola ........................ 370/349 |

OTHER PUBLICATIONS

Heinonen, Johanna, Martta Seppälä, "User Data Overhead Comparison: GPRS vs. UMTS," Apr. 18, 2000, Tampere University of Technology, pp. 1-17 (XP-002236121).

ETSI EN 301 349 V7.5.0 (Jul. 2000), "Digital Cellular Telecommunications System (Phase 2+); General Packet Radio Service, Mobile Státion-Base Station System Interface; Radio Link Control/Medium Access Control Protocol," Annex B1-B7, (XP-002236120).

ETSI EN 301 349 V7.5.0 (Jul. 2000)"Digital Cellular Telecommunications System (Phase 2+); General Packet Radio Service, Mobile Státion-Base Station System Interface; Radio Link Control/Medium Access Control Protocol," GSM 04.60 version 7.5.0 Release 1998 (XP-002236190).

ETSI TS 125322 V3.1.2 (Jan. 2001), Universal Mobile Telecommunications System (UMTS); RLC Protocol Specification (3G TS 25.322 version 3.1.2 Release 1999 (XP-002168713).

* cited by examiner

*Primary Examiner*—Chi Pham
*Assistant Examiner*—Tri H. Phan
(74) *Attorney, Agent, or Firm*—KED & Associates, LLP

(57) ABSTRACT

A method for inserting a PDU LI in an RLC is disclosed. According to the preferred embodiment, if a current PDU size corresponds to the total size of components of the PDU and the current PDU has information indicating that the current PDU size corresponds to the total size of components of the PDU, a component of the next PDU does not include information indicating that the current PDU size corresponds to the total size of components of the PDU. Therefore, the next PDU is free from unnecessary insertion of the LI value so that waste of network resources can be prevented and overhead required for processing unnecessary LI values also can be reduced.

15 Claims, 6 Drawing Sheets

LI=000 0000 indicating that the last segment of the SDU correctly matches the end of the very previous PDU is unnecessarily inputted even though the previous PDU has an LI indicating the end of SDU2

Since the end of this PDU has on excessive octet, LI=111 1111 is inputted for indicating it as a padding, (However, the padding position disappears and it becomes 0 padding)

LI=000 0000 indicating that the last segment of the SDU correctly matches the end of the very previous PDU is inputted

METHOD FOR INSERTING LENGTH INDICATOR IN PROTOCOL DATA UNIT OF RADIO LINK CONTROL This application is a Continuation-In-Part application of U.S. Ser. No. 09/863,400 filed May 24, 2001 now abandoned.

BACKGROUND OF THE INVENTION

1. Field of the Invention

The present invention relates to a radio link protocol, and more particularly to a method for inserting a Length Indicator (LI) in a Radio Link Control (RLC) that selectively controls LI value insertion so that any LI to be inserted in the next PDU may be prevented from being unnecessarily included.

2. Background of the Related Art

The current trend in communications technology is concentrating research into allowing access of multimedia applications without restrictions on time/space and endeavors for visible achievement thereof. The development of digital data processing and transmission technology is consequently on the verge of realizing a real time global data communication system via satellites in which wire and radio communications are unified.

Also, the development of digital data processing and transmission technology allows still and dynamic images to be transmitted in real time via a network, as well as allowing the previous voice communication and information to be accessed freely without discriminating between wire and radio communication at any time and place. International Mobile Telecommunication-2000 (IMT-2000) will be an example thereof.

The Radio Link Control (RLC) layer presented in the invention is the second layer of 3 GPP, which has two kinds of Packet Data Units (PDUs). They are an Unacknowledged Mode Packet Data Unit (UMD PDU), used when the acknowledgment signal transmission to a sending side is not necessary after receiving the PDU in a receiving side, and an Acknowledged Mode PDU(AMD PDU). Each PDU format is as shown in FIG. 1 and FIG. 2, respectively.

As shown in FIG. 1, a format of the UMD PDU is composed of a header, a LI group, data, and a PAD (Padding). The header is composed of a 7 bit Sequence Number as a field for indicating the sequence number of each PDU, and a 1 bit Extension (E) field to indicate if the next field is data or LI and E bit. The data group is a field corresponding to the Service Data Units (SDUs) descended from an upper layer including at least one SDU. Since such a data group is variable in magnitude, a padding is carried out for octet aligning the overall PDU size.

Here, the PDU is sourced from ITU-TX.200/ISO-IEC7498-1, and the SDU is sourced from ITU-TX.140.

As shown in FIG. 2, a format of the AMD PDU includes a header, a LI group, and data. In the AMD PDU, a piggyback type status PDU is inserted instead of the padding to enable the transmission.

The header of the AMD PDU additionally has a 1 bit D/C field to indicate if the pertinent PDU is loaded with data information or control information, a P field as a 1 bit polling field for requesting a status report to the receiving side, and a 2 bit Header Extension (HE) field for notifying if the next data is data or LI and E bit.

In the above UMD PDU and the AMD PDU, the LI group is composed of the LI and E bit, in which each of the LIs is a field for indicating the boundary of each SDU when the PDU includes several SDUs. Each LI indicates the number of octects from the first octet in the data group to the last octet of each SUD. The LI group means the LIs for the SDUs included in one PDU. The LI size is 7 bits or 15 bits.

In the case of the AMD PDU, the 7 bit LI is used if the PDU size is at most 126 octets, and alternatively, the 15 bit LI is used. In the case of the UMD PDU, the 7 bit LI is used if the PDU size is at most 125 octets, and alternatively, the 15 bit LI is used.

Some values of these LIs are predefined for use in specific purposes.

Table 1 illustrates LI values for a specific purpose (In the case of the 7 bit LI), and Table 2 illustrates LI values for a specific purpose in the case of the 15 bit LI.

As can be seen from FIG. 1 and FIG. 2, if the end of one SDU (referred to as A) correctly matches the end of the PDU, the first LI value of the very next PDU (referred to as B) is inserted as 'LI=0' to so indicate.

In the case of the 15 bit long LI, if the last segment of the RLC SDU is one octet insufficient to the end of the PDU, the first LI of the very next PDU has the value of '111 1111 1111 1011' to so indicate. Also, the PDU uses 'LI=1' as a value to indicate that the rest part of the RLC PDU is a padding, where the padding is necessarily positioned at the last of the RLC PDU.

TABLE 1

Length: 7bit

| Bit | Description |
| --- | --- |
| 0000000 | The previous RLC PDU was exactly filled with the last segment of an RLC SDU. |
| 1111100 | Reserved |
| 1111101 | Reserved |
| 1111110 | AM PDU: The rest of the RLC PDU includes a piggy-backed STATUS PDU. UM PDU: Reserved |
| 1111111 | The rest of the RLC PDU is padding. |

TABLE 2

Length: 15bit

| Bit | Description |
| --- | --- |
| 000000000000000 | The previous RLC PDU was exactly filled with the last segment of an RLC SDU. |
| 111111111111011 | The last segment of an RLC SDU was one octet short of exactly filling the last RLC PDU. |
| 111111111111100 | Reserved. |
| 111111111111101 | Reserved. |
| 111111111111110 | AM PDU: The rest of the RLC PDU includes a piggybacked STATUS PDU. UM PDU: Reserved. |
| 111111111111111 | The rest of the PDU is padding. |

FIG. 3 illustrates the ends of the SDUs in one PDU by using the 7 bit LI in the AMD PDU. Here, the PDU size is 35 octets and the data size included in the PDU is 24 octets.

As can bee seen in FIG. 3, the AMD PDU has three SDUs, for example SDU1, SDU2, and SDU3. Each of the SDUs has the size of 11 octets, 9 octets and 4 octets, respectively. The LI values for accumulatively indicating the octet numbers from the first octet to the last octet of each data part of SDU1, SDU2, and SDU3 are inserted as 11 (octet), 20 (octet) and 24 (octet), and more inserted with 'LI=111 1111' to express the rest part of the PDU is a padding (5 octet).

In the related art, LI='0' is inserted into the very next PDU (B) in all the cases where the end of one SDU (A) exactly matches the end of the PDU in the RLC PDU.

FIG. 4, FIG. 5, and FIG. 6 illustrate three cases where LI='0' is inserted according to a method for inserting LI of the related art, in which FIG. 4 shows a proper process, while FIG. 5 and FIG. 6 show problems of unnecessary LI value insertions.

Referring first to FIG. 4, LI='0' is attached to the next PDU. If the LI for the SDU2 in FIG. 4 is included in the current PDU, one octet data of the SDU2 is necessarily shifted to the next PDU due to size of the LI. In other words, if a cumulative sum of LI=22 is recorded in the octet under LI=12 to indicate the end of SDU2, since the currently set PDU size is 25 octets and the sum octet of components of the PDU is 25, the sum octet of the PDU components becomes 26 and the end of the SDU2 does not match the end of the pertinent PDU. Then, it is meaningless to attach the second LI (LI=22).

Therefore in this case, LI='0' is inserted into the first LI of the next PDU (B) instead of inserting the second LI in the first PDU (A) to indicate the end of the SDU2.

However, in the cases as illustrated in FIG. 5 and FIG. 6, the pertinent PDU (A) itself shows that the last SDU of the PDU (A) fits exactly into the PDU (A), including the various LIS, so that LI='0' need not be attached to the next PDU(B). Accordingly, the related art has various problems.

For example, the LI='0' value indicating that the last segment of the very previous SDU exactly matches the end of the previous PDU is unnecessarily inserted to the very next PDU (B) even though the LI indicates the end of the SDU2 of the PDU(A) as shown in FIG. 5.

Also, the LI value or the LI='0' value is inserted to notify that the end of the pertinent PDU (A) (the middle PDU in FIG. 6) is the padding since the end has one excessive octet (causing '0' padding as the position of the padding disappears due to the insertion of the final LI) as shown in FIG. 6. Thus, inserting the LI='0' value in the very next PDU (B) is unnecessary since the LI='1' value means that the end of the pertinent PDU (A) correctly matches the last segment of the SDU2.

In the dotted part under the SDU 2 of the pertinent PDU(A) of FIG. 6, the PDU(A) size is 27 while the sum of the components of the PDU is 26 leaving 1 octet. Therefore, the remaining one octet is padded as LI=1111111.

The aforementioned problems are observed also in the UMD PDU as same as in the AMD PDU. Therefore, according to the method for inserting LI of the related art, the LI value or LI='0' value is unnecessarily inserted into the LI group of the PDU, which includes unnecessarily overlapped information thereby wasting network sources.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is an object of the present invention to provide a method of inserting a length indicator in a PDU that substantially obviates the problems and disadvantages of the related art.

It is another object of the present invention to selectively apply the LI value insertion for indicating pertinent contents in generating PDUs in an RLC.

It is another object of the present invention to indicate an end of the SDU when the very previous PDU (A) correctly matches the end of the previous PDU while preventing unnecessary insertion of an LI value.

It is another object of the present invention to provide a length indicator that is selectively used when the boundary of a Service Data Unit (SDU) is within a Protocol Data Unit (PDU) where a PDU mode is used in a protocol structured Radio Link Control (RLC) layer for data transmission/receipt.

It is another object of the present invention to provide a method for inserting a PDU LI in an RLC which is adapted to prevent unnecessarily inserting an LI value or LI='0' indicating that the last segment of the very previous SDU correctly matches the end of the very previous PDU even though there is an LI indicating the end of the SDU of the previous PDU or if an LI value or LI='1' is inputted for notifying a padding in which the end of the PDU has one excessive octet (in using a 7 bit LI) or two excessive octet (in using 15 bit LI).

In order to achieve at least the above objects in whole or in parts, there is provided a method for inserting PDU LI in an RLC where an PDU is generated from the RLC, in which an LI value can be prevented from being unnecessarily inserted, by which when the end of the SDU in the very previous PDU(A) correctly matches the end of the very previous PDU, the LI value is inputted to the head of an LI group of the next PDU if the LI indicating the end of the very previous SDU cannot be inputted into the very previous PDU, an LI value (LI='0') is not inputted into an LI group of the very next PDU(B) if the previous PDU(A) has the LI indicating the end of the very previous SDU, and an LI value (LI='1') is not inputted into the LI group of the very next PDU(B) if the end of the pertinent PDU(A) has one excessive octet in which the LI value (LI='1') is inputted to notify it as a padding. Consequently, the next PDU is free from unnecessary insertion of the LI value so that waste of network resources can be prevented and overhead required for processing unnecessary LI values also can be reduced.

To further achieve at least these objects in whole or in parts, there is provided a method for inserting a Protocol Data Unit (PDU) Length Indicator (LI) in a Radio Link Control (RLC) where a PDU mode is used in a protocol structured RLC layer for data transmission/receipt, the improvement comprising a eliminating from a next PDU an information component indicating that a current PDU size corresponds to the total size of components of the PDU, if the current PDU size corresponds to the total size of components of the PDU and the current PDU has information indicating that the current PDU size corresponds to the total size of components of the PDU.

To further achieve at least these objects in whole or in parts, there is provided a method for inserting a Protocol Data Unit (PDU) Length Indicator (LI) in a Radio Link Control (RLC) where a PDU mode is used in a protocol structured RLC layer for data transmission/receipt, comprising setting a size of a PDU to be used in a protocol structure and a total size of components of the PDU; determining if an information LI value for an end of a last SDU of the PDU can be indicated by using the set PDU size and inputting the LI value into the PDU if it is determined to be possible; and comparing the set PDU size with the total size of the PDU components.

To further achieve at least these objects in whole or in parts, there is provided a method for inserting a Protocol Data Unit (PDU) Length Indicator (LI) in a Radio Link Control (RLC) where a PDU mode is used in a protocol structured RLC layer for data transmission/receipt, comprising forming a plurality of PDUs from a plurality of SDUs, each PDU having a header containing at least one length indicator representing a length of a corresponding SDU contained in the PDU or representing a sum of lengths of corresponding SDUs contained in the PDU, wherein a PDU contains a length indicator having a prescribed sequence of bit pattern when the previous PDU header did not contain complete length of the SDUs in the previous PDU; and wherein a PDU does not contain a length indicator that indicates the end of the SDU in the previous PDU if the previous PDU ends exactly with a last segment of the SDU.

To further achieve at least these objects in whole or in parts, there is provided a method of forming a header of a PDU, comprising forming a first PDU from a plurality of SDUs; forming a header of the first PDU including a plurality of length indicators (LI), the length indicators representing lengths of corresponding SDUs of the PDU, wherein a final length indicator is provided to indicate that the PDU includes a final segment of padding, and wherein the final segment of padding can have a length of zero such that a subsequent second PDU header does not include information regarding the size of the first PDU.

To further achieve at least these objects in whole or in parts, there is provided a method for inserting a PDU Length Indicator indicating that a previous PDU ends at the end of a last SDU of the PDU in an RLC of a radio communication system where a PDU mode is used in a protocol structured RLC layer for data transmission, comprising detecting whether a previous PDU ends at the end of a last SDU of the PDU; checking whether a length indicator of the previous PDU indicates that the previous PDU ends at the end of the last SDU of the PDU; and inserting a PDU Length Indicator if the length indicator of previous PDU fails to indicate that the previous PDU ends at the end of last SDU of the PDU.

To further achieve at least these objects in whole or in parts, there is provided a method for omitting a PDU Length Indicator indicating that previous PDU ends at the end of a last SDU of the previous PDU in an RLC of a radio communication system where a PDU mode is used in a protocol structured RLC layer for data transmission, comprising checking whether a length indicator of a previous PDU indicates that the previous PDU ends at an end of a last SDU of the previous PDU; and omitting the PDU Length Indicator if the length indicator of the previous PDU indicates that the previous PDU ends at the end of last SDU of the previous PDU.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 7:
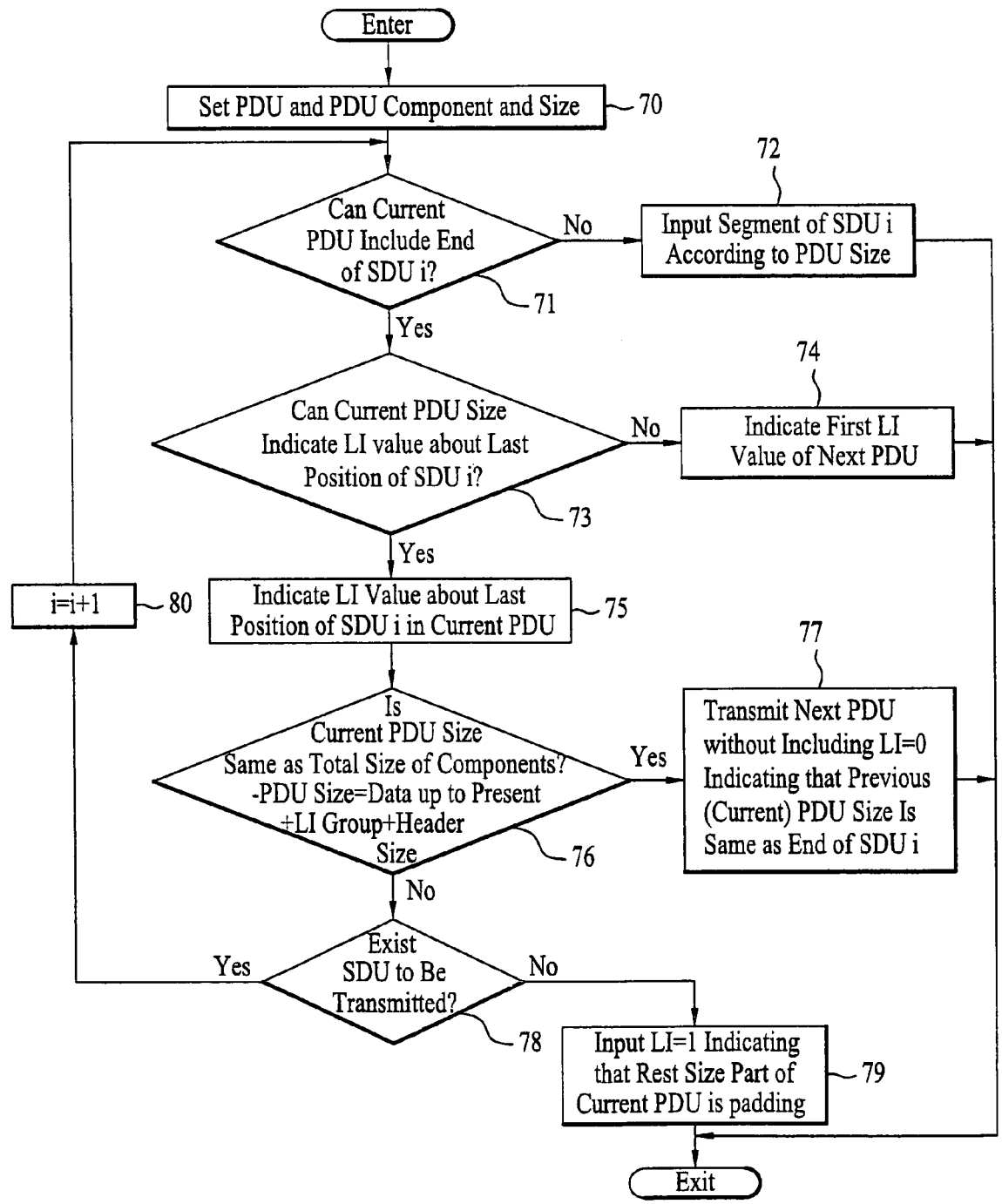
FIG. 7 is a flow chart for showing a method for inserting LI of a PDU in an RLC of the preferred embodiment of the present invention.

Referring to FIG. 7, the size of the PDU to be used in the PDU mode in the protocol structured RLC layer for data transmission/receipt and components of the PDU and the size thereof are first set, as shown in step 70. The size, such as sequence number of the components of the PDU, is a fixed value and the SDU has a variable size.

After step 70, it is determined if the end of SDU i can be included in the current PDU (A), as shown in step 71. If it is determined not to be possible in step 71, a segment of SDU i is inserted according to the PDU size, as shown in step 72.

If, however, it is determined to be possible in step 71, it is determined whether the LI value for the last position of a random number of SDU i can be indicated with the current PDU (A) size in step 73.

Figure 1:
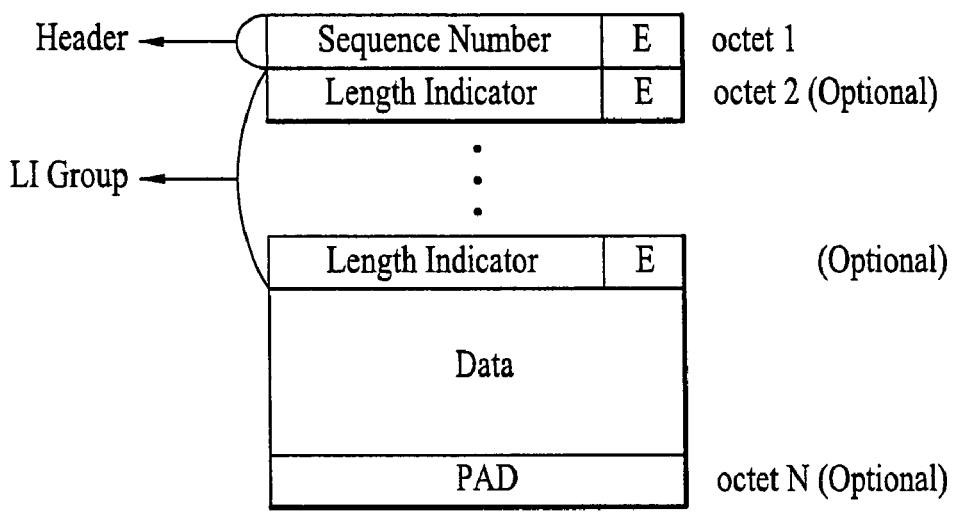
FIG. 1 shows a format of an UMD PDU.
Figure 2:
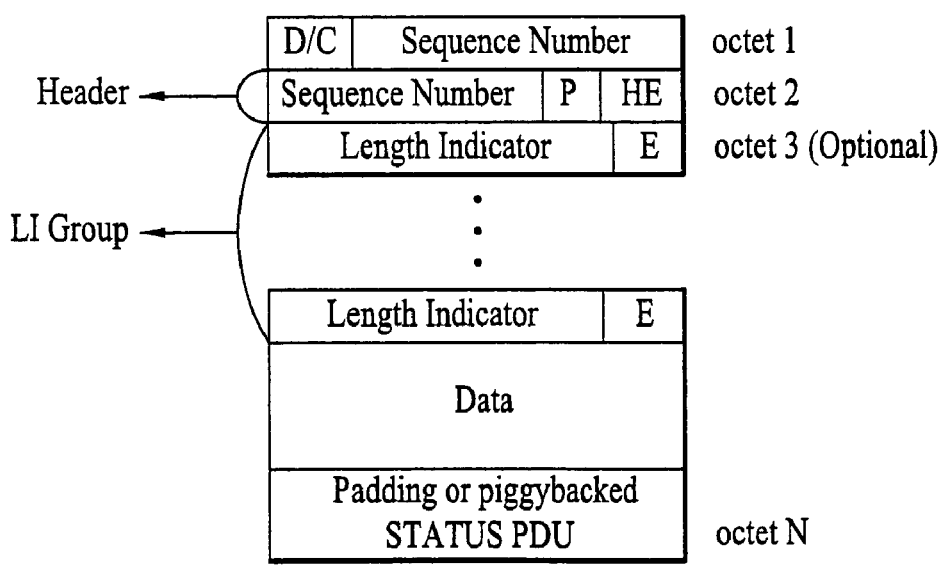
FIG. 2 shows a format of an AMD PDU.
Figure 3:
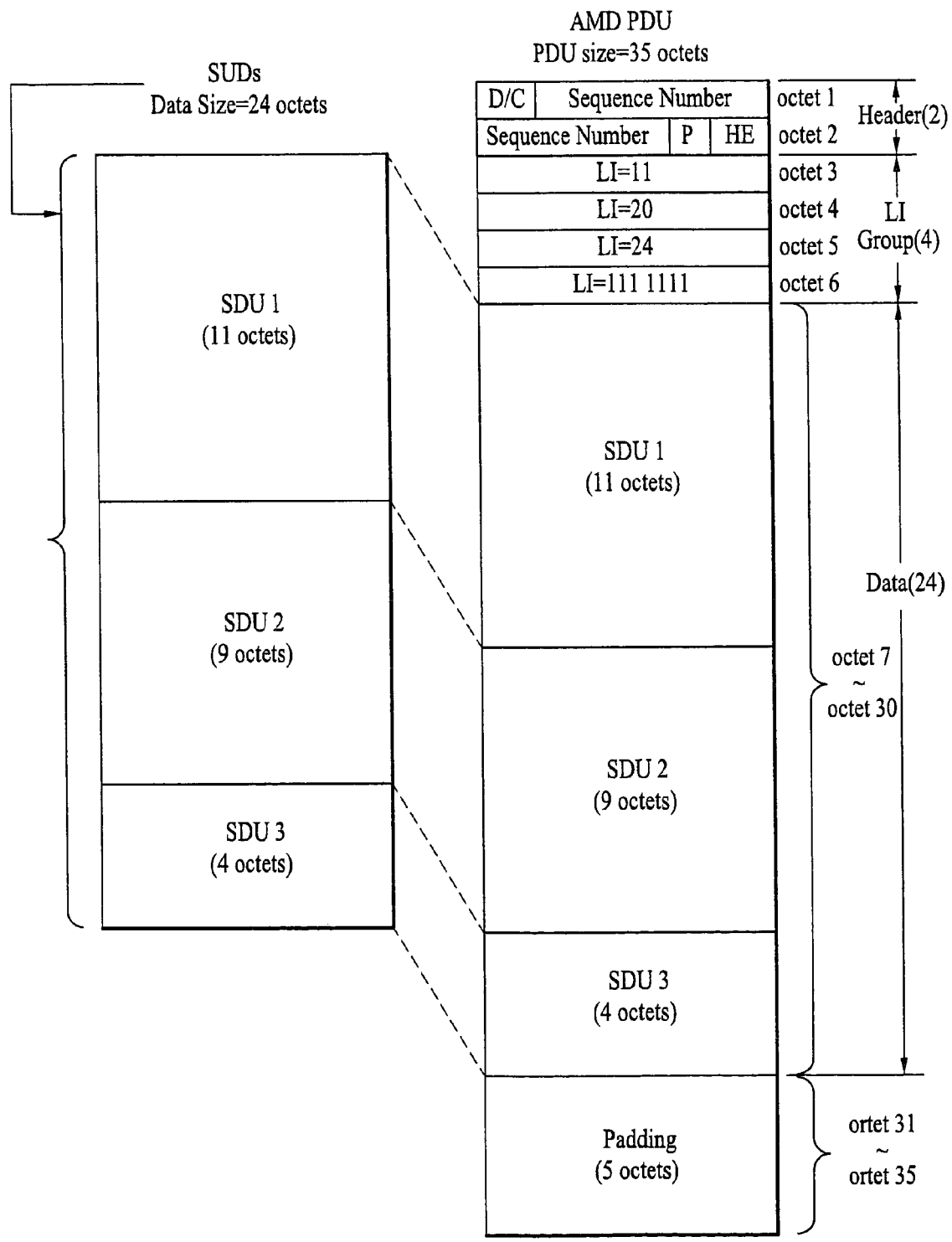
FIG. 3 shows the ends of SDUs in one PDU by using a 7 bit LI in the AMD PDU.
Figure 4:
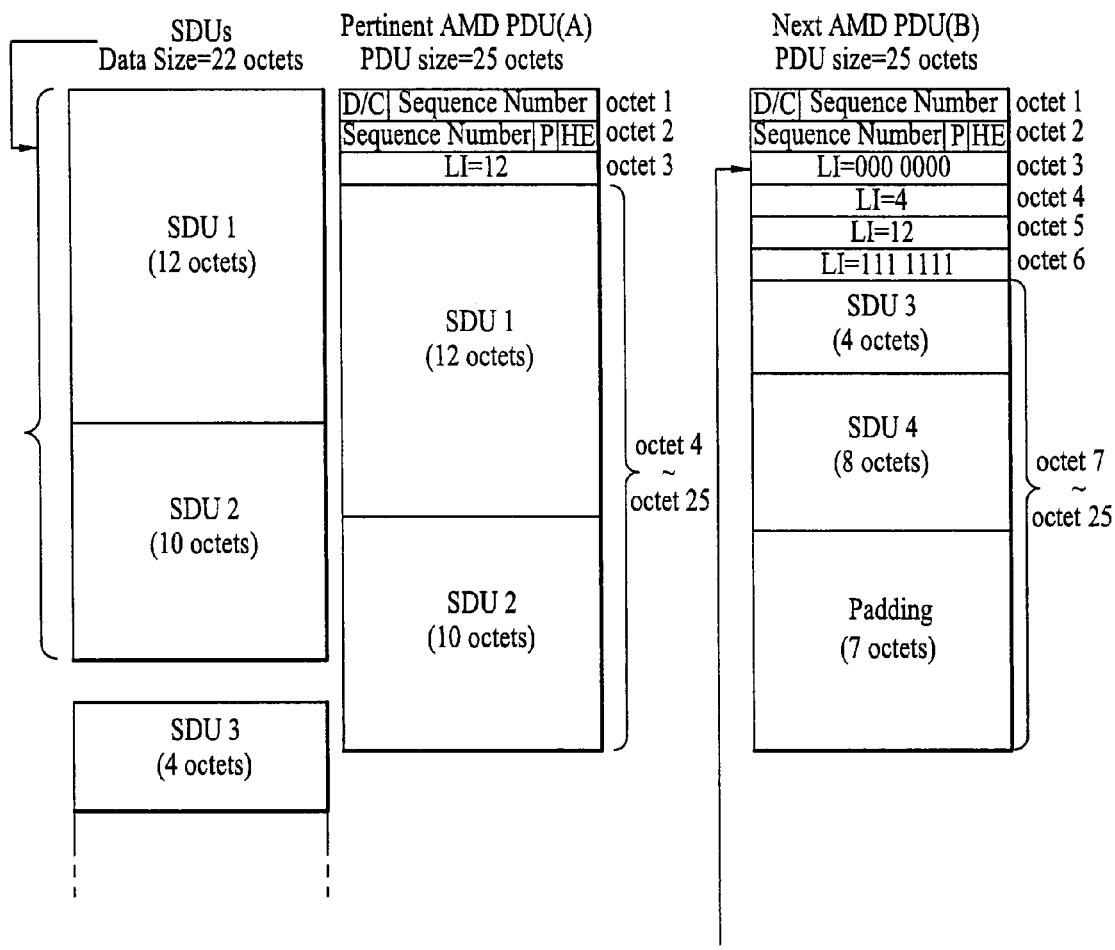
FIG. 4 illustrates an example in which an LI='0' value is necessary in the next PDU in the AMD PDU.

If the last SDU size cannot be indicated with the current PDU (A) size as a result of the determination in step 73, LI=000 0000 for indicating that the last segment of the very previous SDU correctly matches the end of the very previous PDU (A) is recorded as the LI value first sequence of the next PDU (B), and the next PDU (B) is transmitted as in FIG. 4, as shown in step 74.

If the last SDU size can be indicated with the current PDU (A) size as a result of judging in step 73, the LI value of the last position of SDU i is indicated in the e current PDU (A) in step 75.

Then, it is determined if the current PDU (A) size matches the sum of the component size of the PDU (A) in step 76. In other words, if SDU i can be included in the pertinent PDU even after the LI value about the last position of SDU i is inserted as a result of judging in step 73, the process proceeds to step 75 to insert the LI value for the last position of SDU i and to determine if the PDU size is the same as the sum of the data up to the present and the LI group and header size.

As a result of the determination in step 76, if the current PDU (A) size is the same as the sum of the data up to the present and the LI group and header size, inserting LI='0' to the next PDU (B) is not necessary. Consequently, the next PDU(B) is transmitted without including LI=0, which indicates that the current PDU(A) size matches the end of SDU i in step 77.

If, however, the current PDU (A) size is the same as the sum of the data up to the present and the LI group and header size as a result of judging in step 76, the next PDU is transmitted including LI=0, which indicates that the current PDU (A) size matches the end of SDU i, even though inserting LI='0' into the next PDU (B) is not necessary in the related art.

Figure 5:
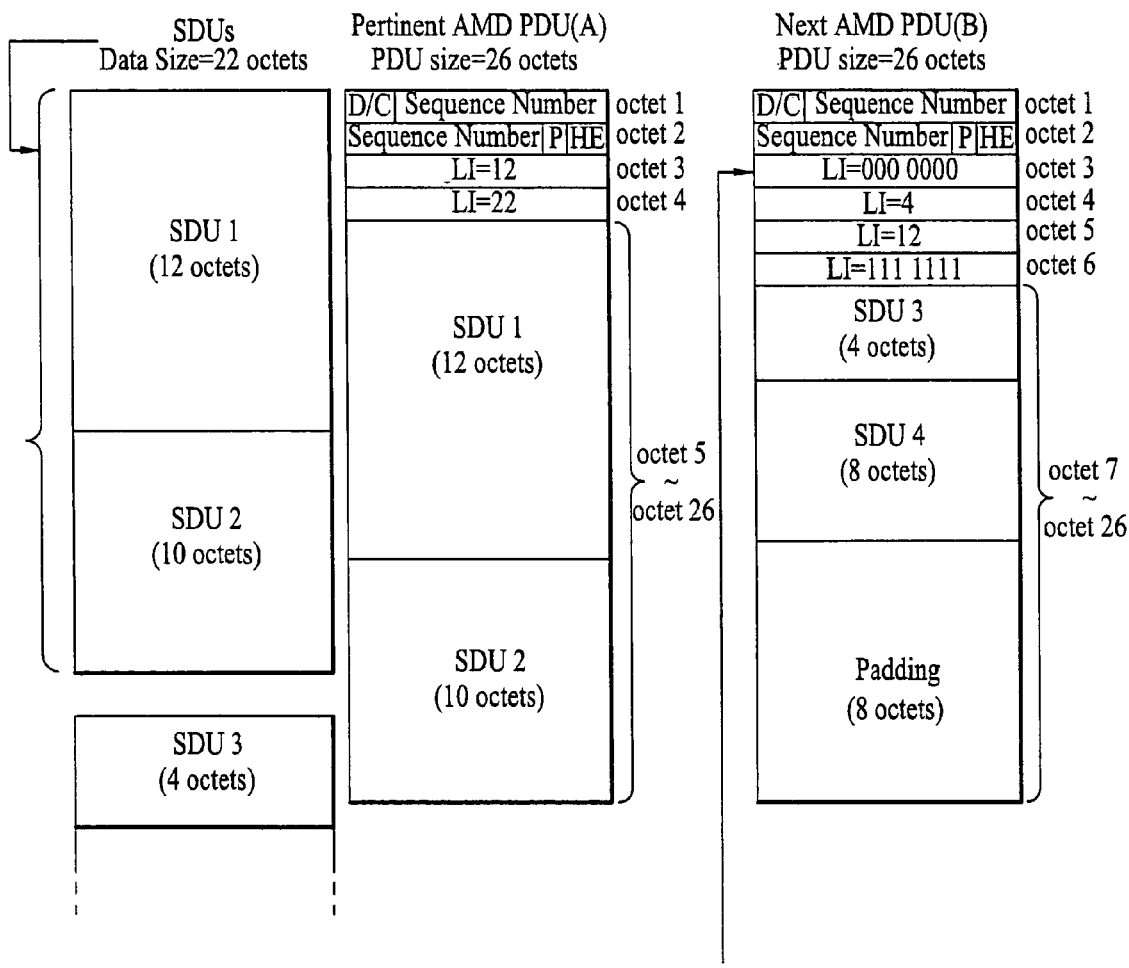
FIG. 5 illustrates an example in which an unnecessary LI is inserted according to a method for inserting LI of the related art.

In other words, referring FIG. 5, LI=000 0000 for indicating that the last segment of the very previous SDU correctly matches the end of the very previous PDU(A) is unnecessarily transmitted as part of the next PDU(B), even though the previous PDU(A) has the LI for indicating the last of SDU 2.

Meanwhile, if the current PDU (A) size is not the same as the sum of the data up to the present and the LI group and header size as a result of the determination in step 76, it is determined whether there is any more SDU to be transmitted in step 78. If there is more SDU to be transmitted, the process proceeds to step 80, where the i value is increased as much as +1 to repeat from step 71 for the SDU in the next sequence.

However, if there is no SDU to be transmitted, the process proceeds to step 79 where the LI='1' value (which means that the rest part of the PDU is a padding) is inputted and a padding is inputted in the rest part of the pertinent PDU. In other words, the next PDU (B) is transmitted without having the LI='0' value or information indicating that the last segment of the very previous SDU correctly matches the end of the very previous PDU (A), which is additionally inputted to the head of the LI group of the next PDU (B).

Figure 6:
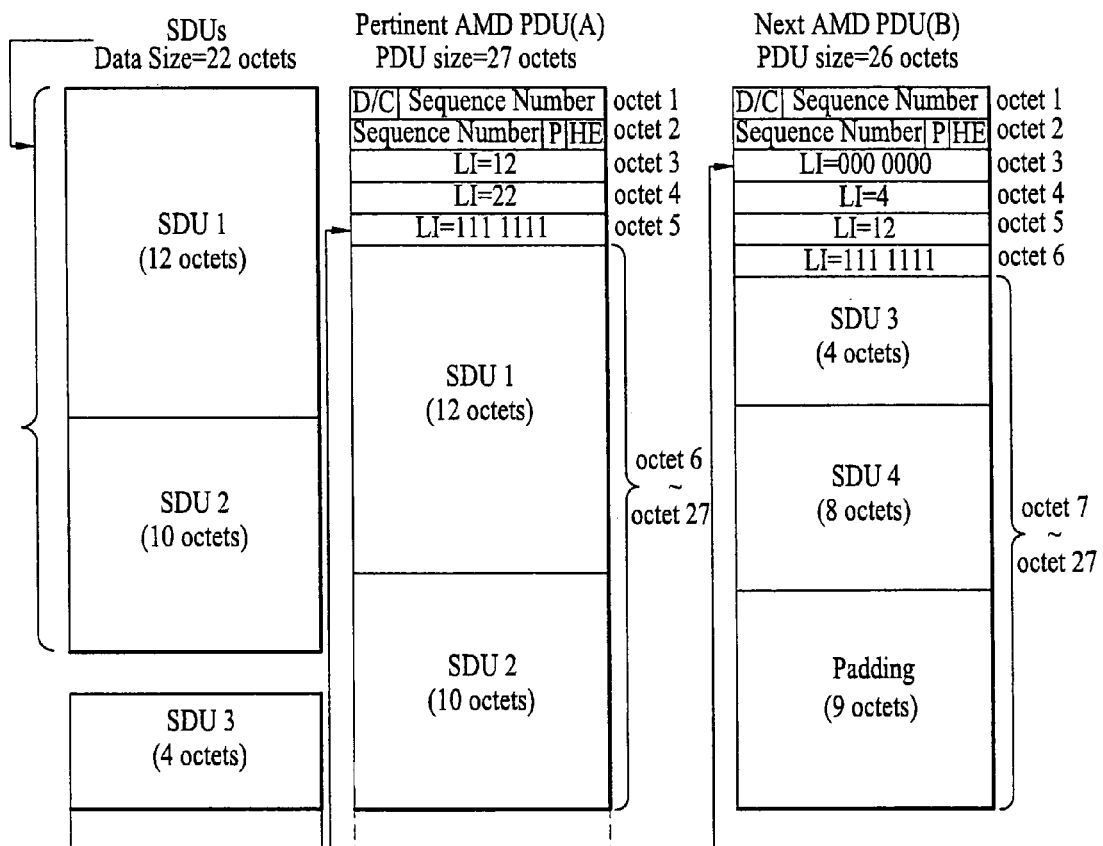
FIG. 6 illustrates another example in which an unnecessary LI is inserted according to a method for inserting LI of the related art.

In the related as shown in FIG. 6, LI=000 0000, which indicates that the last segment of the very previous SDU correctly matches the end of the very previous PDU (A), is unnecessarily transmitted as inputted into the next PDU(B) even though the PDU size becomes the same as the total size of the components of the PDU as LI=111 1111 for indicating the padding when the end of the pertinent PDU (A) is excessive with one octet is inputted into the LI group and thus the padding position becomes zero.

Table 3 illustrates LI values for a specific purpose in the case of the 7 bit LI, and Table 4 illustrates LI values for a specific purpose in the case of the 15 bit LI, both of which are revised according to the preferred embodiment.

Thus, if the end of one SDU correctly matches the end of the PDU, the first LI value of the very next PDU is inserted as 'LI=0' to so indicate.

In the case of the 15 bit long LI, if the last segment of the RLC SDU is one octet insufficient to the end of the PDU, the first LI of the very next PDU has the value of '111 1111 1111 1011' to so indicate. Also, the PDU uses 'LI=1' as a value to indicate that the rest part of the RLC PDU is a padding, where the padding is necessarily positioned at the last of the RLC PDU.

TABLE 3

| Length: 7bit Bit | Description |
|---|---|
| 0000000 | The previous RLC PDU was exactly filled with the last segment of an RLC SDU and there is no LI that indicates the end of the SDU in the previous RLC PDU. |
| 1111100 | Reserved (PDUs with this coding will be discarded by this version of the protocol). |
| 1111101 | Reserved (PDUs with this coding will be discarded by this version of the protocol). |
| 1111110 | AM PDU: The rest of the RLC PDU includes a piggybacked STATUS PDU. UM PDU: Reserved (PDUs with this coding will be discarded by this version of the protocol). |
| 1111111 | The rest of the RLC PDU is padding. The padding length can be zero. |

TABLE 4

| Length: 15bit Bit | Description |
|---|---|
| 000000000000000 | The previous RLC PDU was exactly filled with the last segment of an RLC SDU and there is no LI that indicates the end of the SDU in the previous RLC PDU. |
| 111111111111011 | The last segment of an RLC SDU was one octet short of exactly filling the last RLC PDU. |
| 111111111111100 | Reserved (PDUs with this coding will be discarded by this version of the protocol). |
| 111111111111101 | Reserved (PDUs with this coding will be discarded by this version of the protocol). |
| 111111111111110 | AM PDU: The rest of the RLC PDU includes a piggybacked STATUS PDU. UM PDU: Reserved (PDUs with this coding will be discarded by this version of the protocol). |
| 111111111111111 | The rest of the PDU is padding. The padding length can be zero. |

The present invention as described with reference to the preferred embodiment has many advantages. For example, if a current PDU size corresponds to the total size of components of the PDU and the current PDU has information indicating that the current PDU size corresponds to the total size of components of the PDU, a component of the next PDU does not include information indicating that the current PDU size corresponds to the total size of components of the PDU. Therefore, the next PDU is free from unnecessary insertion of the LI value so that waste of network resources can be prevented and overhead required for processing unnecessary LI values also can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of forming data units to a transmitted to be receiving side, the method being used in a radio link control layer of a communication device, comprising:

including a plurality of data units of an upper layer into a plurality of protocol data units of a lower layer;

providing a header for a current data unit of the lower layer; and providing at least one length indicator for the header of the current data unit of the lower layer, wherein a second length indicator indicating that a last segment of a data unit of the upper layer ends at an end of a previous data unit of the lower layer is not included in the current data unit of the lower layer when the previous data unit of the lower layer is exactly filled with the last segment of the data unit of the upper layer and the previous data unit of the lower layer has a first length indicator indicating an end of the last segment of the data unit of the upper layer.

2. The method of claim 1, wherein the previous data unit of the lower layer has a third length indicator indicating that the previous data unit of the lower layer has padding having a length of zero.

3. The method of claim 1, wherein data units included in the previous and the current data units of the lower layer have variable sizes.

4. The method of claim 1, wherein the second length indicator has a value of "000 0000," if the size of the second length indicator is 7 bits.

5. The method of claim 1, wherein the second length indicator has a value of "000 0000 0000 0000," if the size of the second length indicator is 15 bits.

6. The method of claim 1, wherein the data unit of the upper layer is a service data unit (SDU).

7. The method of claim 1, wherein the previous data unit of the lower layer and the current data unit of the lower layer are a protocol data unit (PDU), respectively.

8. A method of forming data units to be transmitted to a receiving side, the method being used in a radio link control layer of a communication device, comprising:
  providing a first length indicator indicating an end of a last segment of a data unit of an upper layer for a first data unit of a lower layer including at least one data unit of the upper layer; and
  providing at least one length indicator for a second data unit of the lower layer including at least one data unit of the upper layer,
  wherein a second length indicator indicating that a last segment of a data unit of the upper layer ends at an end of a first data unit of the lower layer is not included in the second data unit of the lower layer when the first data unit of the lower layer is exactly filled with the last segment of the data unit of the upper layer.

9. The method of claim 8, further comprising providing a third length indicator indicating that the first data unit of the lower layer has padding, if the first data unit of the lower layer has the padding.

10. The method of claim 9, wherein the padding has a size of zero.

11. The method of claim 8, wherein data units included in the first and the second data units of the lower layer have variable sizes.

12. The method of claim 8, wherein the data unit of the upper layer is a service data unit (SDU).

13. The method of claim 8, wherein the first data unit of the lower layer and the second data unit of the lower layer are a protocol data unit (PDU), respectively.

14. A method of forming protocol data units (PDUs) to be transmitted to a receiving side, the method being used in a radio link control layer of a communication device, comprising:
  providing a first length indicator indicating an end of a last segment of a service data unit (SDU) for a first protocol data unit (PDU) including at least one SDU; and
  providing at least one length indicator for a second PDU including at least one SDU,
  wherein a second length indicator indicating that a last segment of an SDU ends at an end of a first PDU is not included in the second PDU when the first PDU has a third length indicator indicating that the first PDU has padding, wherein the padding has a length of zero.

15. The method of claim 11, wherein SDUs included in the first and the second PDUs have variable sizes.

* * * * *